I. CONRAD.
DIRECTION SIGNAL.
APPLICATION FILED DEC. 23, 1920.

1,390,670.

Patented Sept. 13, 1921.
2 SHEETS—SHEET 1.

Inventor
Isiah Conrad.
By
C. C. Shepherd
Attorney

I. CONRAD.
DIRECTION SIGNAL.
APPLICATION FILED DEC. 23, 1920.

1,390,670.

Patented Sept. 13, 1921.
2 SHEETS—SHEET 2.

Inventor
Isiah Conrad.
By
C. C. Shepherd
Attorney

UNITED STATES PATENT OFFICE.

ISIAH CONRAD, OF COLUMBUS, OHIO.

DIRECTION-SIGNAL.

1,390,670.  Specification of Letters Patent.  Patented Sept. 13, 1921.

Application filed December 23, 1920. Serial No. 432,676.

*To all whom it may concern:*

Be it known that I, ISIAH CONRAD, a citizen of the United States, residing at Columbus, in the county of Franklin and State of Ohio, have invented certain new and useful Improvements in Direction-Signals, of which the following is a specification.

This invention relates to improvements in direction signals for motor vehicles, and has for its primary object to provide a signal which will be capable of being automatically operated by one of the main vehicle controls for the purpose of notifying the operators of adjacent vehicles as to the various movements on the part of the vehicle equipped with the signal.

Another object of the invention resides in the provision of a signal of the aforesaid character which consists of a pivotally mounted direction plate, which is adapted to be supported in conjunction with a bracket structure capable of being mounted upon the rear of a motor vehicle, the said plate being counterbalanced along one of its edges and having its other edge connected with a flexible cable leading to one of the pedal controls of the vehicle, preferably the clutch pedal, whereby when said pedal is pressed inwardly, as will occur when the vehicle is being brought to a stop or when negotiating turns, the said cable will be released from its normal tautly held condition to permit of the presence of slack therein, which will enable the said pivoted plate, by reason of its counterbalanced construction, to revolve upon its bearings so that a surface will be presented to following vehicles upon which indicia is provided, for the purpose of notifying adjacent or following persons that the vehicle equipped with the signal will depart from the course which it has been following.

For a further understanding of the invention, reference is to be had to the following description and to the accompanying drawing, in which similar characters of reference denote like and corresponding parts throughout the several views thereof.

Figure 1:
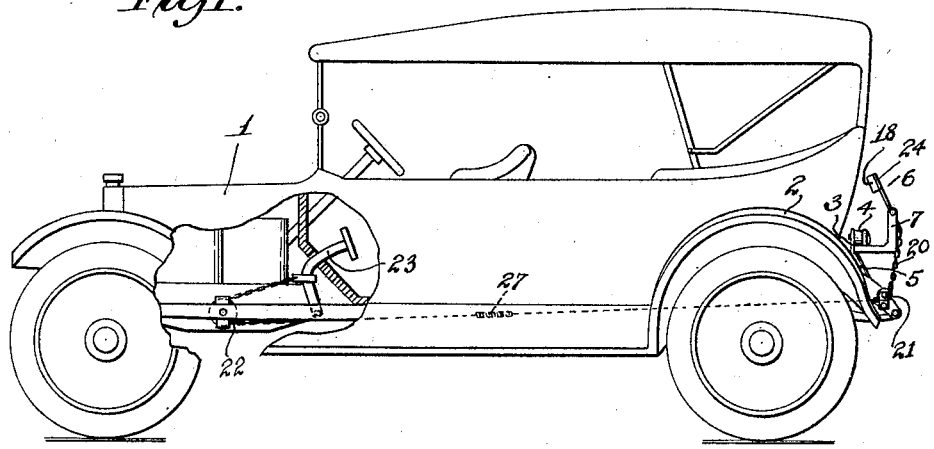
Figure 1 is a side elevation of a motor vehicle equipped with the improved direction signal comprising the present invention.

Referring more particularly to the details of the invention, the numeral 1 designates generally a motor vehicle of approved standard construction which may be of either a passenger or commercial type. In this instance the rear fender 2 of the vehicle is equipped with the usual bracket 3 which is employed for carrying the ordinary rear or tail light 4, and license tag 5, and adapted to be suitably connected with this bracket is the improved direction signal 6 comprising the present invention.

Figure 2:
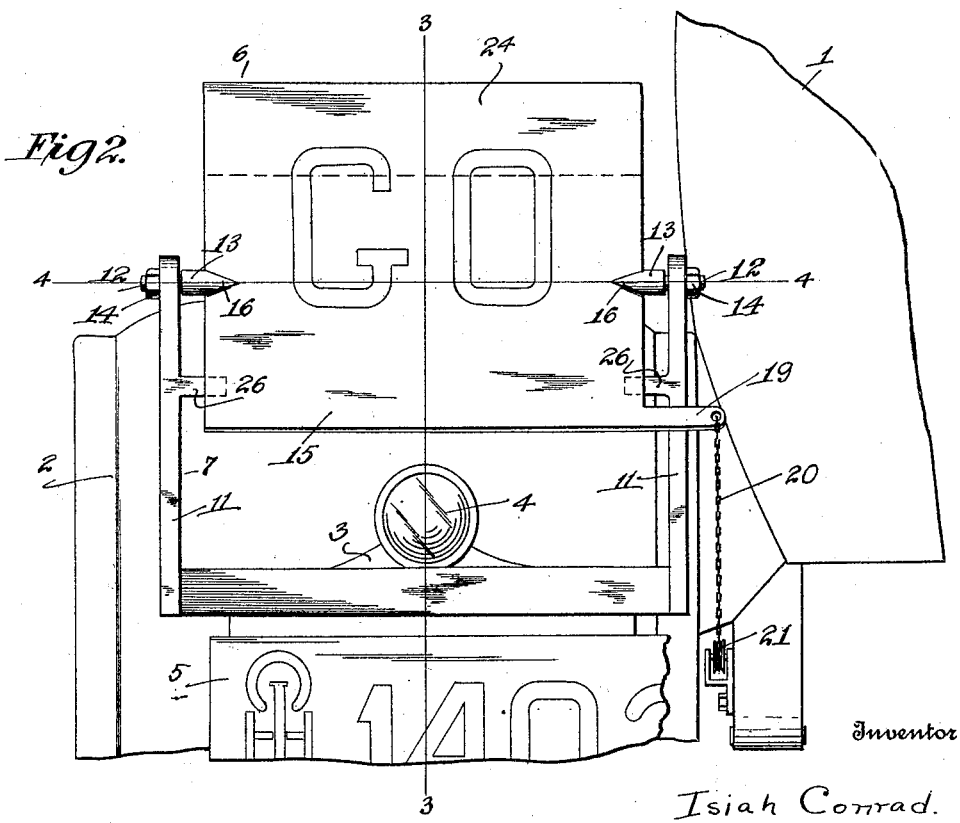
Fig. 2 is a front elevation of the signal.
Figure 3:
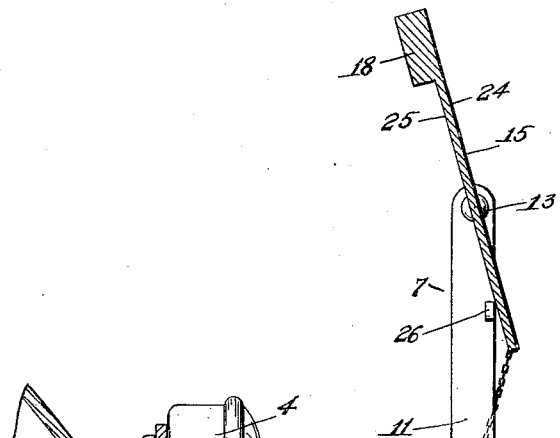
Fig. 3 is a vertical sectional view taken through the signal on the line 3—3 of Fig. 2.
Figure 4:
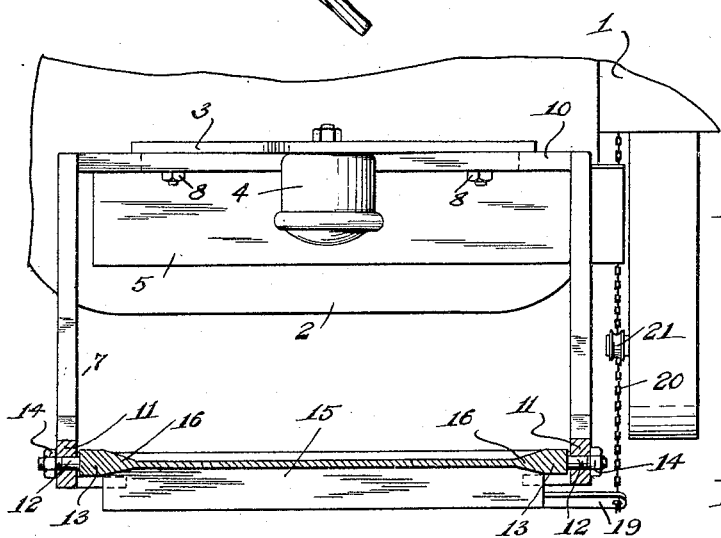
Fig. 4 is a horizontal sectional view taken along the plane indicated by the line 4—4 of Fig. 2.

The signal 6 in its preferred form consists of a substantially rectangular frame 7, which is adapted to be secured to the bracket 3 by means of fastening elements 8, which pass through a slot 9 provided in the rear bar 10 of the frame 7, and operated to rigidly and securely connect the frame 7 in juxtaposition with respect to the light 4. It will be observed, however, upon reference to Fig. 2 that the frame by reason of its open construction will not interfere with a clear view of the light 4. Arising from the frame 7 are upwardly extending standards 11, which have their upper ends bifurcated or forked to receive the threaded shanks 12 of journaling pins 13, nuts or their equivalents 14 being provided upon the ends of the shanks 12 to hold the pins in positions of application. These pins are so positioned as to provide an antifrictional pivotal support for the signaling plate 15 of the signal. This plate 15 is preferably formed from sheet metal and has its vertical marginal edges intermediately enlarged as at 16 for the reception of the conical joints of the pins 13. Thus, by reason of this construction it will be apparent that the plate 15 will be permitted to freely oscillate or rotate with respect to the rigid or fixed frame 7.

One edge of the frame is provided with a counterbalancing weight 18 which normally tends to hold the plate in a fixed or given position, but the normal tendency of the weight 18 is counteracted by providing the opposite edge portion of the plate with an offset stud 19 with which is connected one end of a flexible cable 20, this cable extends downwardly over a suitable guide pulley 21, and then, as shown in Fig. 1, is directed forwardly and longitudinally of the vehicle 1, the forward portion thereof being trained around a second pulley 22 and is secured in any suitable manner to the clutch or bracket pedal 23 of the vehicle. By this construction, it will be apparent that when the pedal 23 is released, the same will be oscillated by the usual spring mechanism to assume its normally outwardly extending position, and by reason of the relative location of the pulley 22 with respect to the pedal, the said cable 20 will be drawn or pulled tautly, thus causing the plate 15 to be rocked with respect to its pivot 13 so as to assume an elevated, substantially vertical position, against the influence of its weight 18. When in such elevated position, see Fig. 1, the surface 24 of the plate will be exposed upon which the legend "go" may be placed in any suitable manner for the purpose of notifying the following drivers that the vehicle equipped with the signal will continue in its course of travel in the same general course. However, on the opposite side of the plate, the legend "stop" is suitably provided which, however, is normally concealed from view by reason of the position of the plate 15. Hence, by reason of this construction, it will be manifest that when the pedal is depressed, a certain amount of slack or looseness will be presented in the length of the cable so that the plate may respond to the influence of the weight 18 so that the surface 25 upon which the word "stop" is provided, will be presented to the view of the following drivers. The operation of the sign or plate is thus rendered entirely automatic, and its operation is absolutely positive by reason of the fact that in order to stop or turn a motor vehicle, it is necessary that the clutch or brake pedal, or both, must be operated. I realize that it is not broadly new to operate a sign of this nature by mechanism controlled from the clutch pedal and therefore, the following claims are directed to a sign which will be operated by the cable arrangement and specific sign construction above set forth. If desired, the frame may be equipped with a stop 26 for the purpose of arresting or limiting the degree of oscillation of the plate 15, and also the cable may be provided at any point in its length with a compensating spring 27, which will prevent undue tension from being placed on the cable and the associated plate. Moreover, it will be observed that by reason of the location of the tail light 4, the said sign will be illuminated so as to be rendered effective for night driving, and the signal is therefore capable of being effectively used at all times. Also, by mounting the signal in connection with the fender 2, that is to one side of the vehicle, the said plate may be viewed either from the front, side or back of the vehicle and hence its range of effectiveness is correspondingly increased.

In view of the foregoing description, taken in conjunction with the accompanying drawing, it is believed that the operation, construction and advantages of the invention together with other utilitarian features will be apparent to those versed in the art, and therefore a more extended explanation has been accordingly omitted.

What is claimed is:

1. A direction signal for motor vehicles, comprising a frame adapted to be mounted rigidly in connection with a motor vehicle, an indicator pivotally mounted in connection with said frame upon horizontal pivots a weight coöperative with a localized portion of said indicator and normally tending to maintain the latter in a given position, a longitudinally extending flexible cable having its rear terminals secured to said indicator and its forward terminal disposed for connection with an operating pedal of said vehicle, said pedal serving, when normally positioned, to draw said cable longitudinally whereby said indicator will be oscillated to assume a given position and upon the actuation of said pedal to release said cable and to thereby permit of the oscillation of said indicator, under the influence of said weight, to a second operating position.

2. A direction signal for motor vehicles, comprising a rigid frame capable of being secured to a motor vehicle, a sign plate having its intermediate portions pivotally connected with said frame, said sign plate being provided with a counterbalancing weight normally operating to maintain the plate in a given position, a cable connected to said plate on the opposite side of its pivotal mounting as regards said weight, said cable being trained around suitable guides and having its opposite end connected with one of the operating pedals of said vehicle, whereby upon the operation of said pedal, said cable will be slackened to permit said plate to revolve to a signaling position by the operation of said weight, and means for limiting the extent of movement of said plate.

3. A direction signal for motor vehicles comprising a rigid frame, a pair of upstanding supports carried by said frame, a sign plate pivoted intermediately of its length in connection with the horizontal axis carried by said supports, said plate having its opposite surfaces provided with direction indicia, a weight connected with said plate and tending to revolve the latter in a given direction, means for normally restraining the action of said weight upon said plate, comprising a flexible cable having one of its ends connected with said plate, the opposite end of said cable being connected with one of the operating pedals of said vehicle, said pedal normally serving to maintain said cable under tension and to thereby hold the plate against the influence of said weight, and whereby upon the operation of said pedal said cable will have its length slackened to permit said plate to revolve under the influence of said weight, and means for illuminating said plate.

4. A direction signal for motor vehicles, comprising a frame adapted to be mounted upon a motor vehicle, said frame being formed to include a pair of spaced upstanding arms, a sign plate pivotally mounted between said arms upon horizontal pivotal supports, a weight coöperative with said sign plate and normally tending to maintain the latter in a given position, and a longitudinally extending flexible cable having its rear terminal secured to said plate and its forward terminal disposed for connection with an operating pedal of said vehicle, said cable and pedal being relatively disposed so that when the pedal assumes a normal position, said cable will be drawn to oscillate said plate against the influence of the weight, whereby upon the operation of the pedal said cable will be released to permit of the operation of the plate under the influence of said weight, means for limiting the extent of movement of said plate.

5. A direction signal for motor vehicles, comprising a frame adapted to be mounted rigidly in connection with a motor vehicle, an indicator pivotally mounted in connection with said frame upon a horizontal pivot, means coöperative with said indicator and normally tending to maintain the latter in a given position, a longitudinally extending flexible member having one of its terminals coöperatively connected with said indicator and its other terminal disposed for connection with an operating pedal of said vehicle, said pedal serving, when normally positioned, to draw said member longitudinally whereby said indicator will be oscillated to assume a given position and upon the actuation of said pedal to release said member and to thereby permit of the oscillation of said indicator, under the influence of said means, to assume a second operating position.

In testimony whereof I affix my signature.
ISIAH CONRAD.